(No Model.)
J. M. LOWREY.
VELOCIPEDE.
No. 258,447.   Patented May 23, 1882.
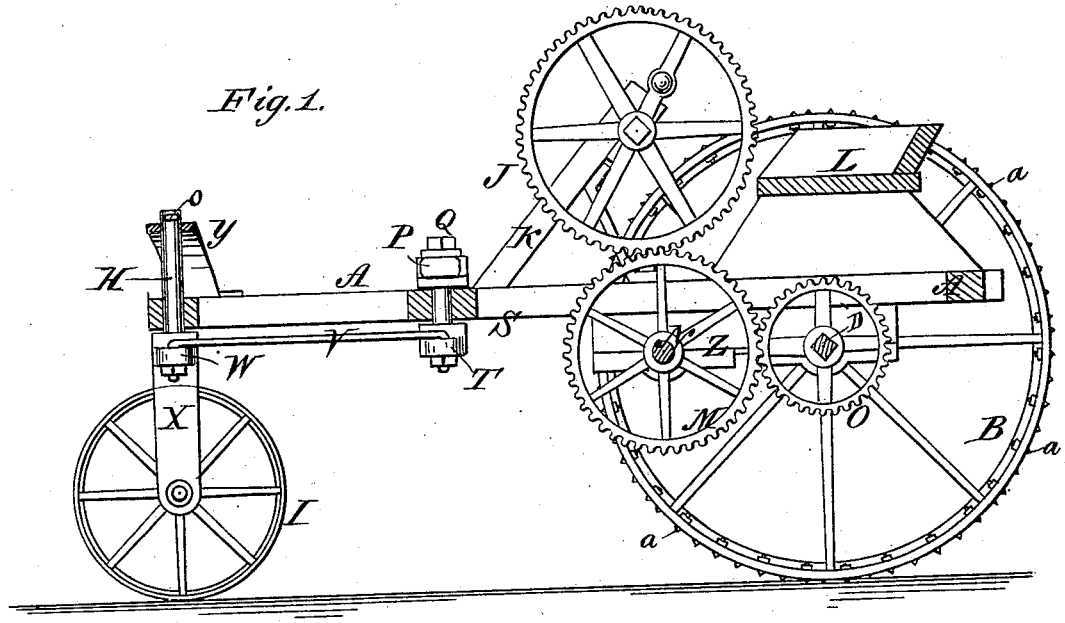
Fig. 1.
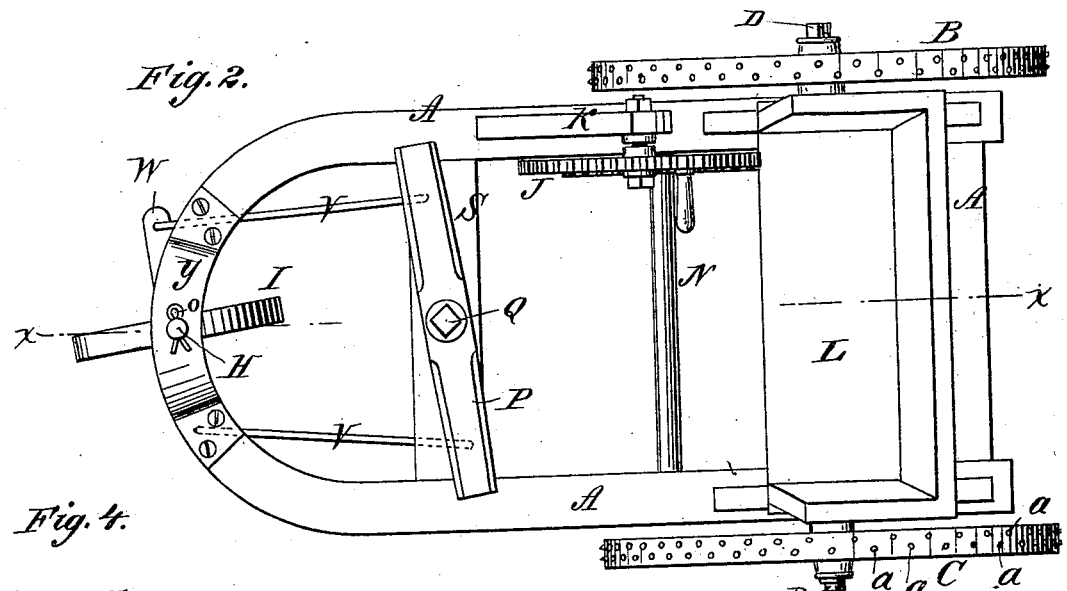
Fig. 2.
Fig. 4.
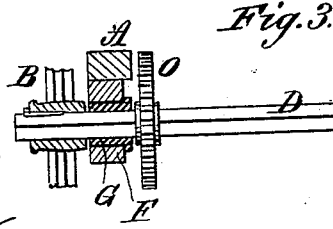
Fig. 3.
WITNESSES:
Donn Twitchell
C. Sedgwick
INVENTOR:
J. M. Lowrey
BY Munn & Co
ATTORNEYS.
N. PETERS, Photo-Lithographer, Washington, D. C.

UNITED STATES PATENT OFFICE.

JOHN M. LOWREY, OF LA GRANGE, GEORGIA.

VELOCIPEDE.

SPECIFICATION forming part of Letters Patent No. 258,447, dated May 23, 1882.

Application filed March 28, 1882. (No model.)

*To all whom it may concern:*

Be it known that I, JOHN M. LOWREY, of La Grange, in the county of Troup and State of Georgia, have invented a new and Improved Road-Vehicle, of which the following is a full, clear, and exact description.

This invention consists of a light three-wheeled vehicle for road service, with a novel contrivance of gearing for applying hand-power for propelling it and foot-power for steering it, and having studs applied to the large wheels for traction, one of which wheels is keyed fast to the axle for driving the vehicle, while the other is fitted loosely thereon to facilitate turning out and going around corners, the object being to provide a simple, cheap, and efficient vehicle that may be of use instead of the horse and buggy in many cases, the same being cheaper and more readily within the reach of many persons, also being safer for old persons, women, and others not used to the management of horses, all as hereinafter described more in detail.

Reference is to be had to the accompanying drawings, forming part of this specification, in which similar letters of reference indicate corresponding parts in all the figures.

Figure 1 is a longitudinal sectional elevation of the said improved vehicle, taken on the line $x$ $x$ of Fig. 2. Fig. 2 is a plan view. Fig. 3 is a transverse section through the hind wheels, and Fig. 4 is a transverse section through one of the wheel-rims.

A represents a suitable frame for a three-wheeled vehicle, the same being rectangular at the hind end and curved at the front end, and mounted on the two large traction-wheels B C by an axle, D, which is square or keyed, or both, in the hub of wheel B and loose in the hub of wheel C, the shaft being free to turn in the boxes E F, attached to frame A, the square end having a thimble, G, fitted on it to form the journal in the box F. The front end of the frame is mounted on the spindle H of a caster-wheel, I, which is designed to be about half the size of wheels B C in practice.

For applying the driving power a hand-power cog-wheel driver, J, is mounted on a supporting-standard, K, preferably on the right-hand side of the frame and a little in advance of the seat L of the rider, and in convenient relation thereto to be worked to advantage by the rider on the seat. This wheel gears with an intermediate wheel, M, turning on shaft N in bearings Z, attached to the under side of the frame, and gearing with the pinion O, fixed upon the axle D.

By the use of the intermediate wheel, M, the connection is established between the driver J, located where it is convenient to operate it, and the axle D in its place, and it also gives the forward motion to the axle from the driver, which it is most convenient for the operator to turn in the same direction that the driving-wheels B C do. If geared directly to the pinion O, said driver J would have to be turned the backward way, which is less convenient for the operator.

The steering-gear consists of the vibrating lever-bar P on the center pivot, Q, mounted on cross-bar S of the frame, pivot Q extending through to the under side of the bar S, where it carries another vibrating lever-bar, T, which is connected by rods V with the arms W of the caster-wheel standard X, so that as the lever-bar P is vibrated by the feet of the operator the wheel I will be guided as required to steer the vehicle.

For the purpose of securing the requisite traction for the driving-wheels I propose to apply two rows of stud-points, $a$, the same being the pointed heads of bolts $b$, inserted in the rims of the wheels B C, as shown, and secured by nuts $d$, and to prevent the wheels from jolting I place the heads of one row midway between the heads of the other row, whereby the wheels run more smoothly than they would if the heads of the two rows of studs were placed side by side. The spindle H of the caster-wheel I is stayed above the frame by the bent metal bar Y in a simple but substantial way, a split key, $o$, or other suitable pin passing through the spindle over the stay-bar to hold the caster-wheel in proper operative position.

Having thus fully described my invention, I claim as new and desire to secure by Letters Patent—

1. The combination, with an axle, D, having fast wheel B, thimble G, and loose wheel C, of the frame A, having the bearing-boxes E F, and the hand mechanism O M J, as and for the purpose described.

2. The combination, with the middle pivot in cross-bar S, of the levers P T on opposite sides of said cross-bar, the rods V, the arms W, the standard X, and the wheel I, as and for the purpose specified.

3. The driving-axle, positively secured in the hub of one of the driving-wheels and working loosely in the other, and being fitted in the frame-box F by a thimble, G, substantially as specified.

JOHN M. LOWREY.

Witnesses:
WM. H. HUNTLEY,
J. L. SCHAUB.